United States Patent
Kobayashi

[19]

[11] Patent Number: 5,878,270
[45] Date of Patent: Mar. 2, 1999

[54] LIBRARY APPARATUS AND DRIVE RECOGNITION METHOD

[75] Inventor: Manabu Kobayashi, Kawasaki, Japan

[73] Assignee: Fujitsu Limited, Kawasaki, Japan

[21] Appl. No.: 670,347

[22] Filed: Jun. 25, 1996

[30] Foreign Application Priority Data

Nov. 17, 1995 [JP] Japan ................................ 7-300167

[51] Int. Cl.⁶ .................................................. G06F 15/02
[52] U.S. Cl. ........................ 395/821; 395/712; 395/829
[58] Field of Search ................................... 395/800, 200, 395/829, 712, 600, 830, 700, 500, 821; 364/550

[56] References Cited

U.S. PATENT DOCUMENTS

| | | | |
|---|---|---|---|
| 5,109,484 | 4/1992 | Hughes | 395/200 |
| 5,313,617 | 5/1994 | Nakano | 395/500 |
| 5,444,642 | 8/1995 | Montgomery | 364/550 |
| 5,493,727 | 2/1996 | Ohya | 395/800 |
| 5,530,895 | 6/1996 | Enstrom | 395/829 |
| 5,560,004 | 9/1996 | Weng | 395/600 |
| 5,574,915 | 11/1996 | Lemon | 395/700 |
| 5,654,901 | 8/1997 | Boman | 395/712 |
| 5,657,448 | 8/1997 | Wadsworth | 395/200 |
| 5,689,726 | 11/1997 | Lin | 395/830 |

FOREIGN PATENT DOCUMENTS

| | | |
|---|---|---|
| 61-229146 | 10/1986 | Japan . |
| 4-257050 | 9/1992 | Japan . |
| 5-257854 | 10/1993 | Japan . |
| 6-161935 | 10/1994 | Japan . |

*Primary Examiner*—Curtis A. Kuntz
*Assistant Examiner*—Hassen A. Mia
*Attorney, Agent, or Firm*—Greer, Burns, & Crain, Ltd.

[57] ABSTRACT

In a library apparatus, a transport device for transporting a medium to a drive unit and inserting the medium into the drive unit has a function of issuing, via a SCSI bus, a command to devices connected to the SCSI bus. Upon the power-on, the initiator function issues an inquiry command to the devices connected to the SCSI bus so that the number and types of the drive units installed in the library apparatus can be recognized based on inquiry data sent by the devices. In accordance with the number and types of the drive units installed in the library apparatus recognized, the transport device is controlled to properly transport the medium to the drive unit and insert the medium into the drive unit.

19 Claims, 8 Drawing Sheets

| VENDOR IDENTIFICATION | PRODUCT IDENTIFICATION | INSERTION FORCE | INSERTION SPEED | HOLDING TIME |
|---|---|---|---|---|
| VENDOR IDENTIFICATION OF DRIVE 1 | PRODUCT IDENTIFICATION OF DRIVE 1 | N 1 | V 1 | T 1 |
| VENDOR IDENTIFICATION OF DRIVE 2 | PRODUCT IDENTIFICATION OF DRIVE 2 | N 2 | V 2 | T 2 |
| ⋮ | | | | |
| VENDOR IDENTIFICATION OF DRIVE n | PRODUCT IDENTIFICATION OF DRIVE n | N n | V n | T n |

LIBRARY APPARATUS AND DRIVE RECOGNITION METHOD

BACKGROUND OF THE INVENTION

1. Field of the Invention

The present invention relates to library apparatuses and drive recognition methods. More particularly, the present invention relates to a library apparatus in which a plurality of types of drive units for reading information from and writing information to an information recording medium accommodated therein are installed, and a drive recognition method used in the same.

A library apparatus houses a number of information recording mediums, such as a magnetooptical disk, and reads information from and write information to the information recording medium loaded into a drive unit.

Recently, there is an increasing demand to process large-capacity multimedia data, image data and graphic data. Correspondingly, there is an increasing need for a library apparatus capable of storing data in a large number of information recording mediums.

Various manufacturers provide various types of drive units to be housed in a library apparatus. Many improvements are being made in drive units.

As a result, a library apparatus tends to be designed to allow an extensive selection and exchanging of drive units to be housed therein. Different drive units are characterized by different insertion forces exerted when the information recording medium is inserted into the drive unit through an insertion opening; different insertion speeds; and different holding time which it takes for the recording medium to be fully introduced in the drive unit. As a result, it is necessary to control an operation of a transport device for transporting the information recording medium into the drive unit, in accordance with the type of drive unit in which the recording medium is mounted. That is, it is necessary for the transporting device to recognize the number and types of the drive units installed.

2. Description of the Prior Art

Figure 1:
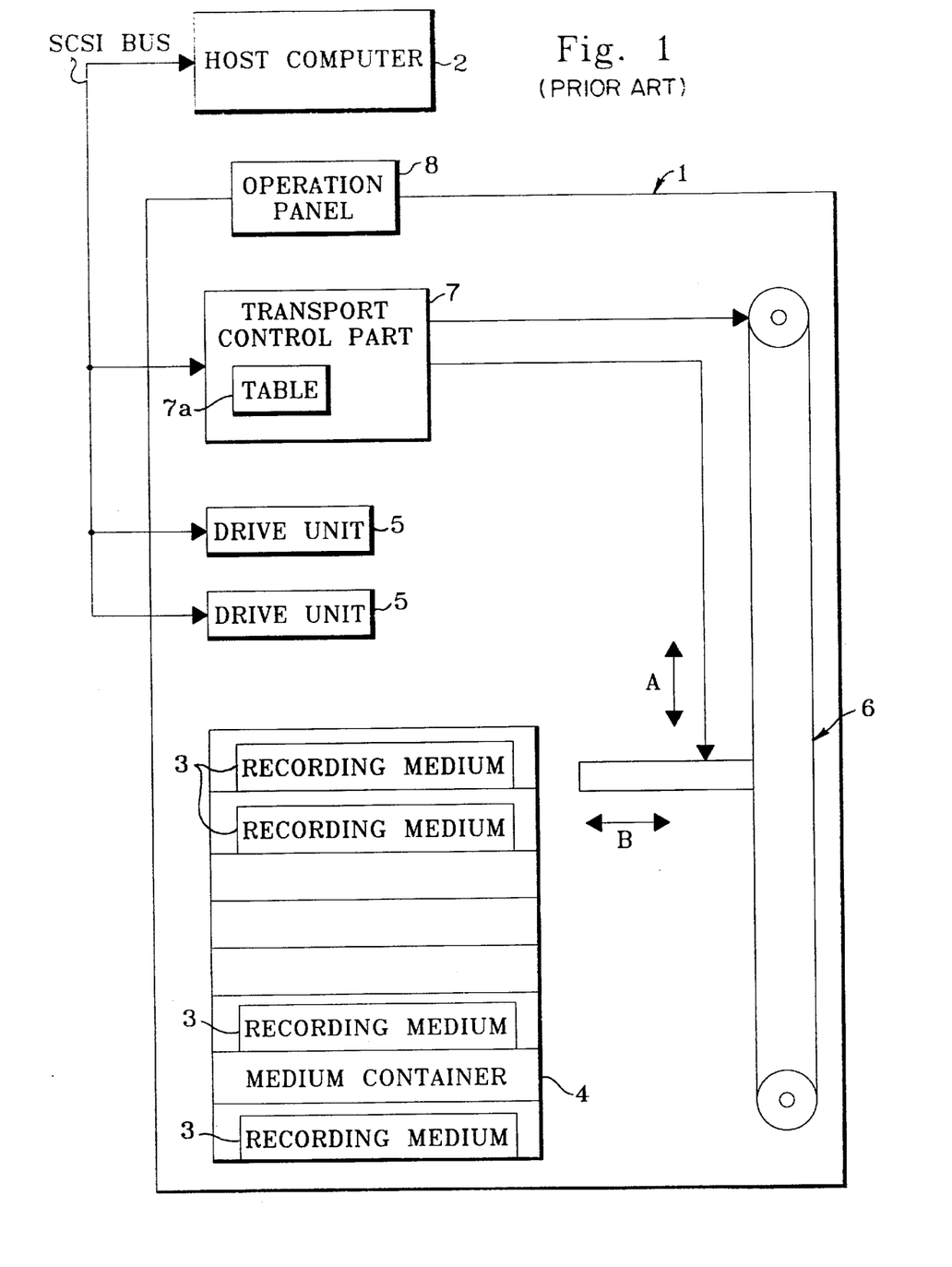
FIG. 1 is a block diagram of a conventional library apparatus.

FIG. 1 is a schematic block diagram of a conventional library apparatus 1. The library apparatus 1 is connected to a host computer 2 via a Small Computer System Interface (SCSI) bus. The library apparatus performs reading and writing of data in accordance with an instruction from the host computer 2.

The library apparatus 1 comprises a medium container 4 for housing an information recording medium 3 such as a magnetooptical disk; a drive unit 5 in which the information recording medium 3 is mounted so that information is read from and written to the information recording medium; a medium transport part 6 for removing the information recording medium 3 from the medium container 4 and mounting the same in the drive unit 5 and for removing the information recording medium 3 from the drive unit 5 and housing the same in the medium container 4; a medium transport control part 7 for controlling the medium transport part 6 in accordance with a request from the host computer 2; and an operation panel 8 by which a user inputs information necessary for transport of the medium, i.e., information relating to the number and types of the drive units 5 installed in the library apparatus 1.

When a new drive unit 5 is installed in the library apparatus 1, the number of the drive units 5 installed in the library apparatus 1 changes. Therefore, it is necessary to modify the control effected by the medium transport control part 7 so that the information recording medium is delivered by the transport part 6 to the drive unit that is last mounted in the library apparatus. In case the drive unit 5 last mounted in the library apparatus 1 is from a manufacturer or of a product type different from the manufacturer or the product type of the drive units that had been installed in the library apparatus 1, a different insertion position and a different insertion force are required. It is necessary for the transport control part 7 to control the transport part 6, accordingly.

For this reason, it is necessary for the transport control part 7 to recognize the number and types of the drive units 5 installed in the library apparatus 1, whenever a new drive unit 5 is connected.

A power supply for the library apparatus 1 is turned off before the new drive unit 5 is installed therein. The drive unit 5 is then secured in a predetermined position by screws and the like. A handshake is established between a SCSI bus from the new drive unit 5 and the corresponding SCSI bus of the existing drive units and the transport control part 7. The new drive unit 5 is then connected to the host computer 2. When the power is turned on so that the library apparatus 1 is activated, information relating to the number and types of the drive units 5 already registered in an internal table 7a of the transport control part 7 is read.

By operating the operation panel 8, information specifying the number and types of the drive units 5 including the new drive unit 5 is input to the transport control part 7, thus rewriting the old information. The transport control part 7 stores the updated information in the internal table 7a.

The transport part 6 in the library apparatus 1 is controlled in accordance with the information stored in the internal table 7a of the transport control part 7.

When the host computer 2 issues to the transport control part 7 a command to move the information recording medium 3 to the drive unit, the transport control part 7 refers to the information, stored in the internal table 7a, specifying the number and types of the drive units. In accordance with the information, the transport control part 7 controls the position at which the transport part 6 holds the information recording medium 3 and also controls parameters in the insertion operation, i.e., insertion force, insertion speed and holding time.

As described above, in the conventional library apparatus, it is necessary for a user to manually input information necessary to control the transport part 6, whenever a new drive unit is connected to the library apparatus 1 or when any of the drive units is exchanged to a new one.

A failure to manually input the information or erroneous input of the information results in the transport control part failing to properly recognize the number and types of the drive units installed in the library apparatus. Thus, the information recording medium may fail to be transported to the newly mounted drive unit, or may not be mounted in the drive unit because of a difference in insertion force, insertion speed and holding time from one drive unit to another.

SUMMARY OF THE INVENTION

Accordingly, an object of the present invention is to provide a library apparatus and a drive recognition method in which the aforementioned problems are eliminated.

Another and more specific object of the present invention is to provide a library apparatus and a drive recognition method in which a drive unit installed in the library apparatus is automatically recognized and set up for operation.

The aforementioned objects of the present invention can be achieved by a library apparatus comprising: a medium container for containing an information recording medium; a drive unit having the information recording medium mounted therein and capable of reading information from and writing information to the information recording medium; medium transport means for transporting the information recording medium between the medium container and the drive unit; a memory for storing identification information for drive units installable in the library apparatus; an initiator for issuing an instruction to send the identification information via a SCSI bus; recognizing means for comparing, in accordance with an instruction issued by the initiator, the identification information sent by a target device connected to the SCSI bus with the identification information stored in the memory, and the matching identification information is recognized as identification information for the drive units installed. According to the library apparatus of the present invention, there is provided an initiator for issuing via a SCSI bus an instruction requesting transmission of identification information. The initiator automatically acquires identification information for a device connected to the SCSI bus. The acquired identification information is compared with identification information stored in a memory which stores identification information for the installable drive units. A match of the identification information results in a recognition that a drive unit is installed. The number of the drive units installed is known by the number of matches of the identification information. The type of a drive unit installed is known by the specific identification information that match. Thus, manual input of identification information is not necessary.

The recognizing means may recognize the number of drive units installed in the library apparatus by knowing the number of matches of identification information, and recognize types of drive units installed in the library apparatus by knowing matches of identification information. The library apparatus may further comprise medium transport control means for controlling the medium transport means in accordance with the identification information recognized by the recognizing means. According to these aspects, by controlling the medium transport means in accordance with the number and types of the driving units recognized by the recognizing means, it is possible to control transportation of the mediums in accordance with operating parameters of each of the installed drive units.

The memory may store predetermined operating parameters of each of the drive units in addition to the identification information, and the medium transport control means reads from the memory the predetermined operating parameters corresponding to the identification information recognized by the recognizing means, and controls the medium transport means to properly insert the information recording medium into the drive unit in accordance with the read predetermined operating parameters. According to this aspect, the memory stores operating parameters of the drive units with respect to mediums as well as storing identification information for the drive units. Therefore, it is possible to control transportation of the mediums in accordance with the operating parameters of each of the drive units.

The aforementioned objects can also be achieved by a library apparatus comprising: a medium container for containing an information recording medium; a drive unit having the information recording medium mounted therein and capable of reading information from and writing information to the information recording medium; and a medium transport means connected to the drive unit via a SCSI bus and transporting the information recording medium between the medium container and the drive unit; wherein the medium transport means issues to a device connected to the SCSI bus and via the SCSI bus an instruction for sending identification information for identifying the device, and the drive units installed in the library apparatus are recognized based on the identification information sent, in accordance with the instruction issued by the medium transport means, by the device connected to the SCSI bus. According to the library apparatus described above, an instruction is issued via a SCSI bus to request transmission of identification information for identifying the device connected to the SCSI bus, so that the identification information for the device connected to the SCSI bus is automatically acquired. The number and types of the drive units connected to the library apparatus are known according to the acquired identification information. Thus, no manual input is required.

BRIEF DESCRIPTION OF THE DRAWINGS

Other objects and further features of the present invention will be apparent from the following detailed description when read in conjunction with the accompanying drawings, in which:

FIG. 7 is a flowchart for an operation according to the embodiment executed in a transport control part when the library apparatus is turned on; and FIG. 8 is a flowchart for an operation according to the embodiment executed in a target device connected via a SCSI bus to the library apparatus when the library apparatus is turned on.

DESCRIPTION OF THE PREFERRED EMBODIMENTS

Figure 2:
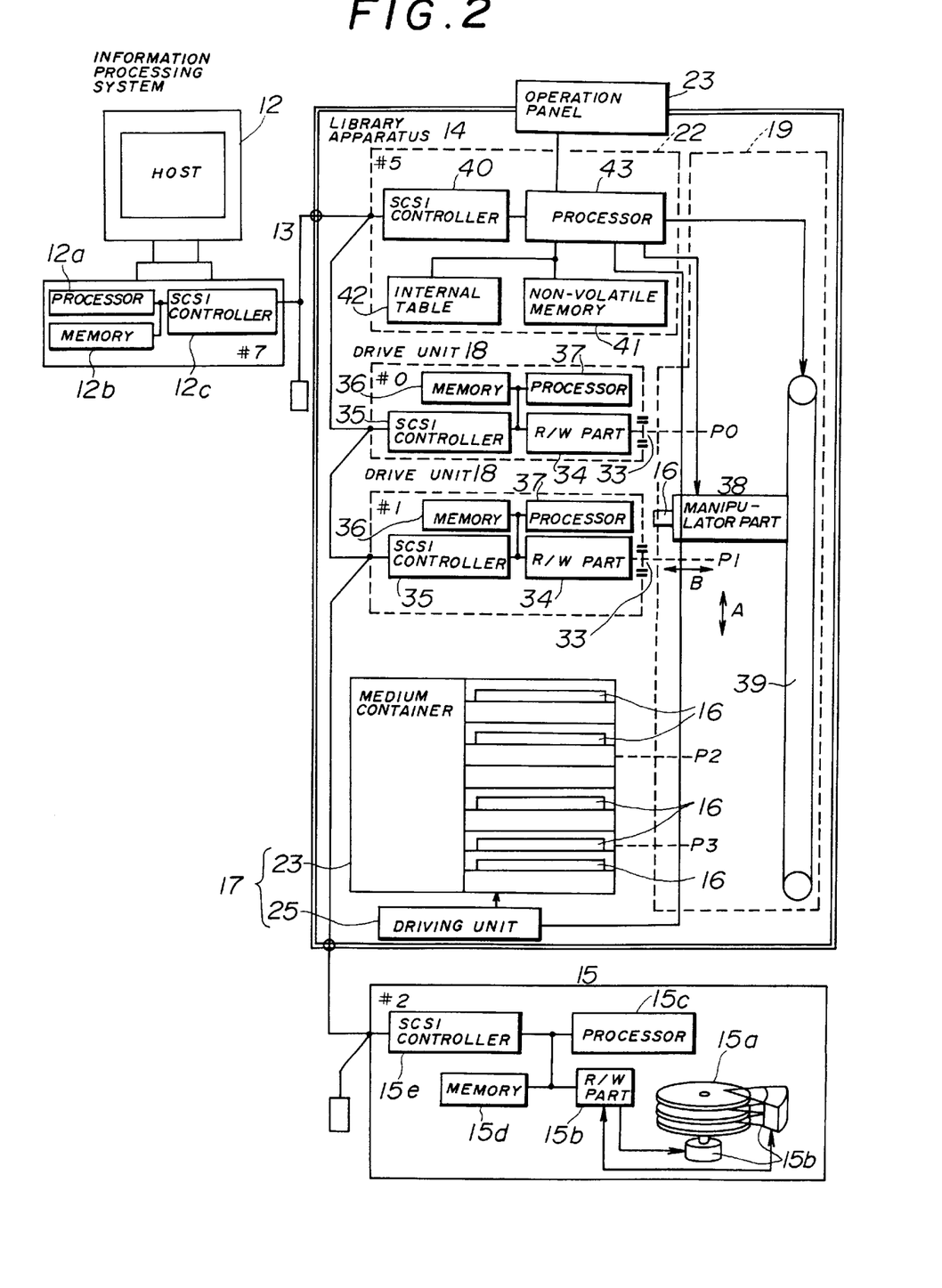
FIG. 2 is a block diagram of a library apparatus according to an embodiment of the present invention.

FIG. 2 is a block diagram illustrating an embodiment of the present invention. More specifically, FIG. 2 is a block diagram of an information processing system 11 which includes a library apparatus using a magnetooptical disk as a recording medium, for example.

The information processing system 11 is constructed such that a library apparatus 14 and an external hard disk drive 15 are connected to a host computer 12 via a SCSI bus 13. The host computer 12 issues an instruction to the library apparatus 14 and the external hard disk drive 15 via the SCSI bus 13. Data is read from or written to the medium in accordance with the instruction issued so as to be exchanged between the library apparatus 14 and the host computer 12.

The host computer 12 comprises a processor 12a for processing information; a memory 12b which stores vendor identification information and product identification information needed in SCSI connection for identification of the host computer 12; and a SCSI controller 12c which provides connection to the SCSI bus 13.

The external hard disk drive 15 comprises a hard disk 15a for storing information; a read/write part 15b for reading information from the hard disk 15a and writing information to it; a processor 15c for controlling the read/write part 15b according to an externally supplied command; a memory 15d which stores vendor identification information and product identification information needed in SCSI connection for identification of the external hard disk drive 15; and a SCSI controller 15e which provides connection to the SCSI bus 13.

Figure 3:
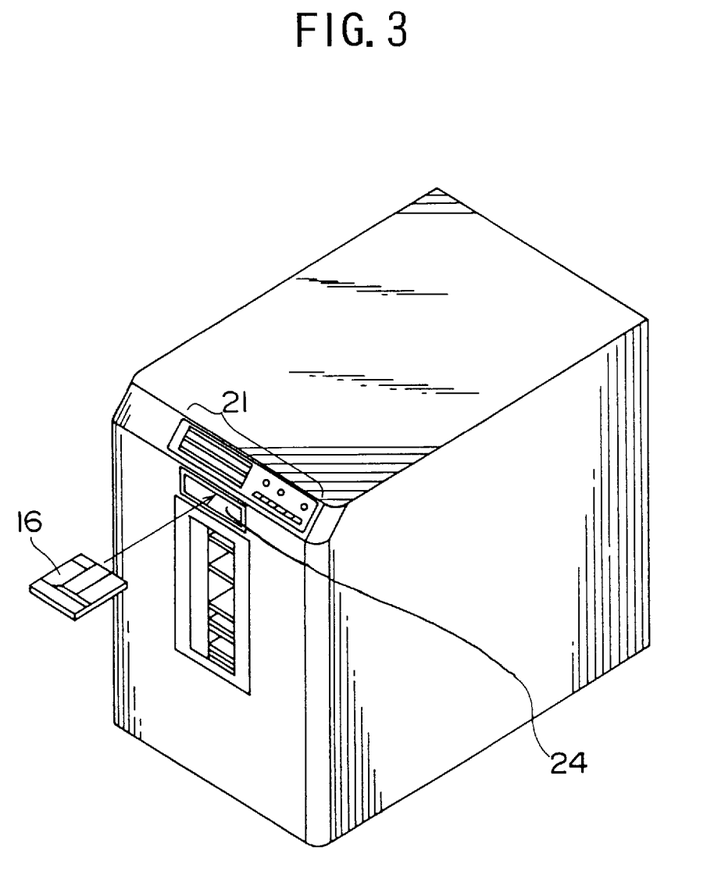
FIG. 3 is a perspective view showing an appearance of the library apparatus according to the embodiment.
Figure 4:
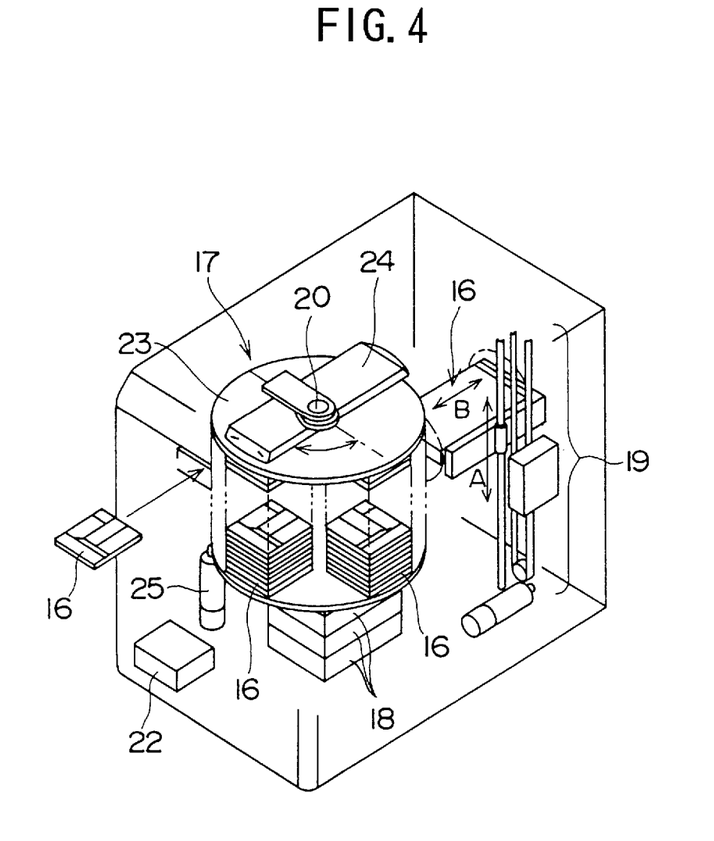
FIG. 4 is a perspective view showing the interior of the library apparatus according to the embodiment.

FIG. 3 is a perspective view showing an appearance of the library apparatus according to the embodiment of the present invention. FIG. 4 is a perspective view showing the interior of the library apparatus according to the embodiment.

The library apparatus shown in FIGS. 3 and 4 have a construction similar to that of the library apparatus disclosed in Japanese Patent Application No. 6-266509, which was filed on Oct. 31, 1994 by the applicant of the present invention. The feature of the embodiment of the present invention pertains to a method of obtaining information needed to operate the library apparatus disclosed in Japanese Patent Application No. 6-266509. The mechanical construction of the library apparatus 14 is the same as that of the above-identified application.

The library apparatus 14 according to the embodiment comprises a medium container 17 for housing an information recording medium 16 (for example, a magnetooptical disk); a drive unit 18 on which the information recording medium 16 is mounted so that information is read from or written to the information recording medium 16; a transport device 19 for removing the information recording medium 16 from the medium container 17 and mounting the same in the drive unit 18 and also for removing the information recording medium 16 from the drive unit 18 and storing the same in the medium container 17; a controller 22 for controlling the operation of the medium container 17 and the transport device 19 in accordance with an instruction from the host computer 12; and an operation panel 21 which processes a user-input instruction for the controller 22 and displays the status of the drive unit 18.

The medium container 17 comprises a rotatable container 23 in which four stacks of information recording mediums 16 are placed around the rotation shaft 20; an introducing and ejecting part 24 for introducing the information recording medium 16 from outside and ejecting the information recording medium 16 accommodated in the media container 17; and a driving part 25 for driving the rotatable container 23 into rotation. The driving part 25 is connected to the controller 22 and drives the rotatable container 23 into rotation so that the information recording medium 16 to be removed faces the transport device 19, in accordance with a control signal supplied by the controller 22.

As shown in FIG. 4, the drive unit 18 is stacked below the medium container 17 in a direction indicated by the arrow A. The library apparatus 14 is constructed such that exchanging and addition of drive units 18 are enabled. Exchanging of the drive unit 18 is performed after removing a cover of the library apparatus 14.

Figure 5A:
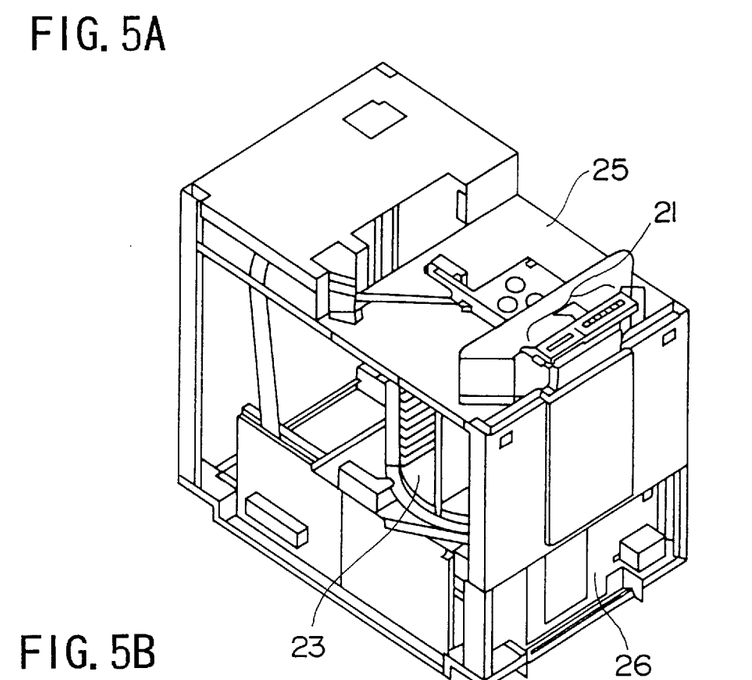
FIG. 5A is a perspective view of the library apparatus according to the embodiment with a cover removed.
Figure 5B:
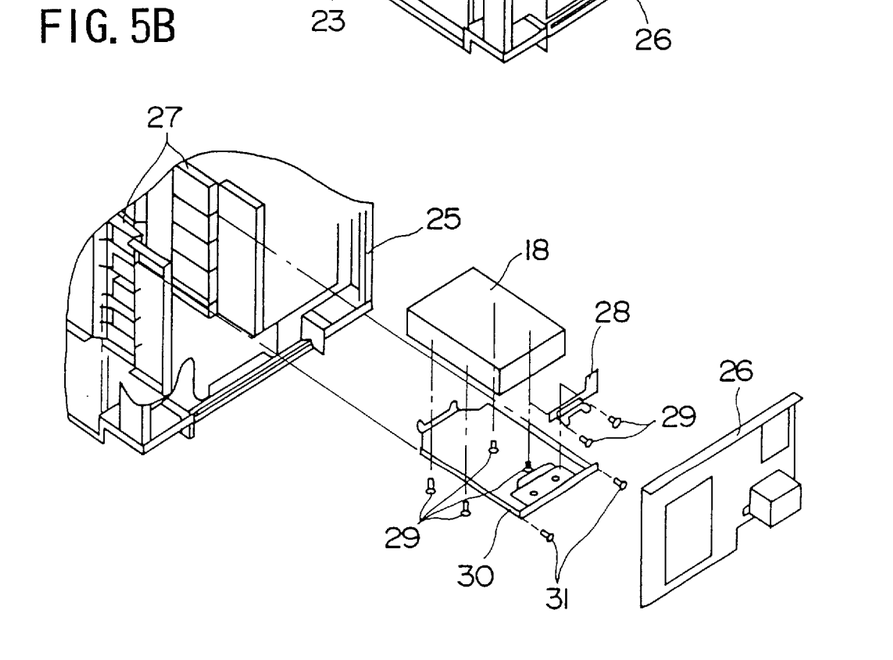
FIG. 5B is a perspective view showing how a drive unit is installed in the library apparatus according to the embodiment.

FIG. 5A is a perspective view of the library apparatus according to the embodiment with a cover removed. FIG. 5B is a perspective view showing how a drive unit 18 is installed in the library apparatus according to the embodiment.

When the cover is removed from the library apparatus 14, a peripheral frame 25 is exposed. By removing a fan unit 26 secured to cover the peripheral frame 25 to cool the drive unit 18, a drive unit mounting frame 27 is exposed, as shown in FIG. 5B. The drive unit 18 is then fitted to the drive unit mounting frame 27.

In order for the drive unit 18 to be fitted to the drive unit mounting frame 27, the drive unit 18 and a relay printed board 28 are fixed to a blanket 30 using screws 29, whereupon the blanket 30 is secured to the drive unit mounting frame 27 using screws 31. The drive unit mounting frame 27 is provided with a plurality of blanket mounting racks, so that the blanket 30 carrying the drive unit 18 is secured to each of the plurality of blanket mounting racks.

As shown in FIG. 2, the drive unit 18 comprises an information read/write unit 34 for introducing the information recording medium to a predetermined position via a medium insertion opening 33 so as to write information to or read information from the medium, and for ejecting the information recording medium 16 via the medium insertion opening 33; a SCSI controller 35 that provides connection to the SCSI bus; a memory 36 that stores vendor identification information and product identification information for identification of the drive unit 18; and a processor 37 for transmitting, when the library apparatus 14 is turned on, the vendor identification information and the product identification information from the memory 36 in accordance with an inquiry command from the transport device 19, and for controlling, in a normal operation, the operation of the information read/write unit 34 in accordance with an instruction from the host computer 12.

The transport device 19 comprises a manipulator part 38 for gripping the information recording medium 16 and moving the same horizontally (in a direction indicated by the arrow B); and a transport part 39 for moving the manipulator part 38 perpendicularly (in a direction indicated by the arrow A). The manipulator part 38 is connected to the controller 22. In accordance with a manipulator control signal supplied by the controller 22, a voltage supplied to a motor (not shown) built in the manipulator part 38 is controlled so that the rotation torque and rotation speed thereof are controlled. Thus, the gripping force for the information recording medium 16, and the horizontal driving force and speed for the information recording medium 16 are controlled. Like the manipulator part 38, the transport part 39 is also connected to the controller 22. In accordance with a transport position control signal supplied by the controller 22, the transport part 39 is controlled such that a rotational position of a built-in motor (not shown) is detected using a rotary encoder (not shown) or the like.

The controller 22 comprises a SCSI controller 40 that connects the transport device 19 to the SCSI bus 13; a memory 41 that stores vendor identification information and product identification information identifying the types of driver unit installable in the library apparatus 14, and also stores information specifying the insertion force, the insertion speed and the holding time that each type of the drive units provides when the information recording medium 16 is inserted; an internal table 42 that stores the number of drive units installed in the library apparatus, the vendor identification information and the product identification information of the installed drive units, and the insertion force, the insertion speed and the holding time that each drive unit provides when the information recording medium 16 is inserted; and a processor 43 which automatically recognizes, immediately after the library apparatus is turned on, the number and types of the drive units installed in the library apparatus 14, by referring to information stored in the internal table 42, so as to set in the internal table 42 information for controlling the manipulator part 38 and the transport part 39, and which, in a normal operation, generates, in accordance with a command from the SCSI controller 40 or an instruction from the operation panel 21, the manipulator control signal for controlling the manipulator part 38 and the transport control signal for controlling the transport part 39, based on the information stored in the internal table 42.

Figure 6:
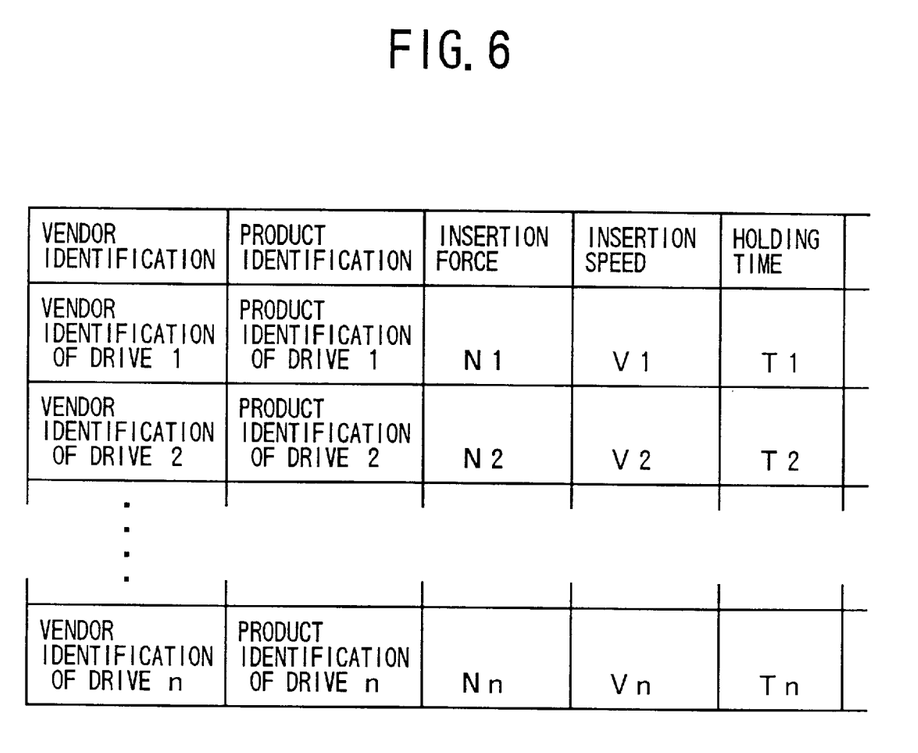
FIG. 6 shows a data structure of a memory in the embodiment.

FIG. 6 shows a data structure of a memory in the embodiment.

The memory 41 stores vendor identification information and product identification information for the drive units installable in the library apparatus 14; insertion forces $N_1–N_n$ exerted when the information recording medium 16 is inserted through the opening 33 of the respective drive units 18; insertion speeds $V_{1-n}$ at which the information recording medium 16 is inserted via the opening 33; and time $T_1–T_n$ (holding time) required to fully introduce the information recording medium 16 into the respective drive unit 18.

When the library apparatus 14 is turned on, the internal table 42 stores the number (m) of drive units 18 found to be installed in the library apparatus 14; the vendor identification information and the product identification information of the installed drive units; insertion forces $N_1–N_m$ that the respective drive units provide; insertion speeds $V_1–V_m$; and holding time $T_1–T_m$. A specific procedure to have the internal table 42 store the information will be described later.

The processor 43 controls the transport device 19 in accordance with the number, stored in the internal table 42, of installed drive units 18 such that the manipulator part 38 stops at a position that it can find the drive unit, and also controls the operation of the manipulator part 38 in accordance with the insertion forces $N_1–N_m$ the insertion speeds $V_1–V_m$ and the holding time $T_1–T_m$.

Figure 7:
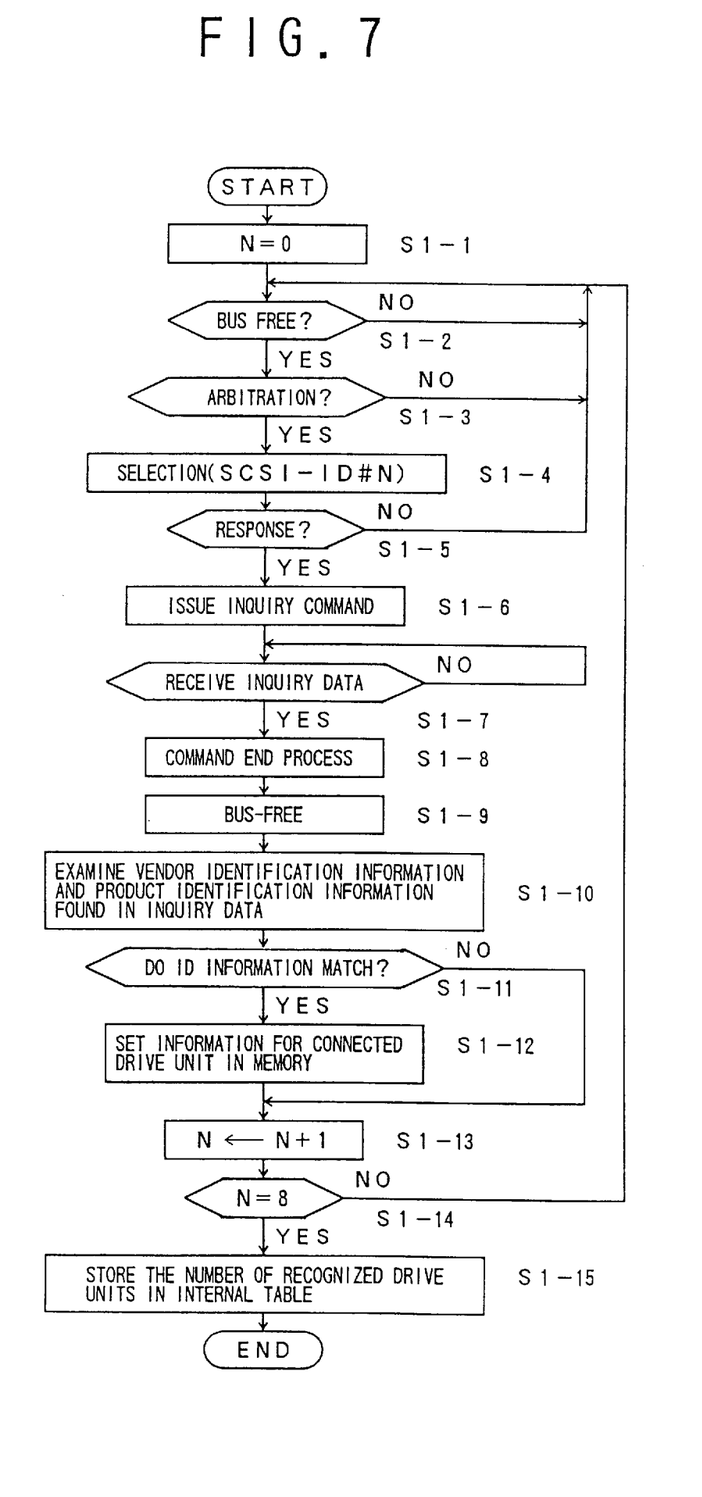
Figure 8:
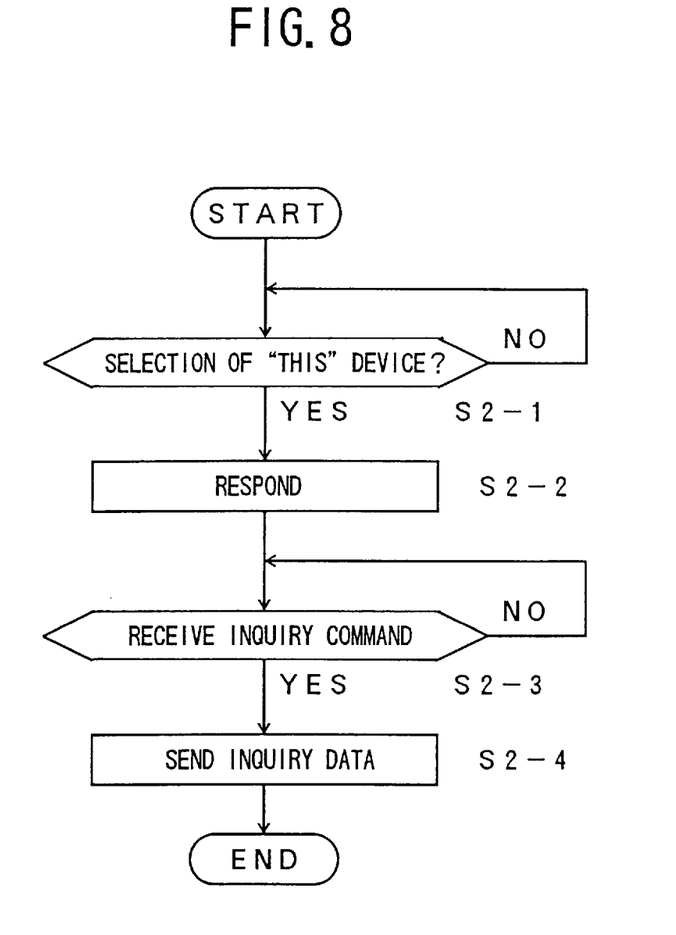

FIG. 7 is a flowchart for an operation according to the embodiment executed in the transport control part when the library apparatus is turned on. FIG. 8 is a flowchart for an operation according to the embodiment executed in a target device connected via the SCSI bus to the library apparatus when the library apparatus is turned.

For the sake of description, a SCSI-ID#5 is set in the controller 22 of the library apparatus 14 in an exemplary system. Further, it is assumed that two drive units are installed in the library apparatus 14, one of the installed drive units having a SCSI-ID#0 and the other having a SCSI-ID#1. It is also assumed that the host computer 12 has a SCSI-ID#7 and the external hard disk drive 15 has a SCSI-ID#2.

The controller 22 activates an initiator function when the library apparatus 14 is connected to the host computer 12 via the SCSI bus 13 and turned on so as to determine the number and types of the drive units installed. In order to determine the number and types of the drive units installed, the processor 43 of the controller 22 first set N to "0" (step S1-1), where N is used for specifying a target SCSI-ID (see step S1-5 below).

Subsequently, the processor 43 controls the SCSI controller 40 and makes a determination as to whether or not a bus-free phase exists, a bus-free phase being a state in which no device is using the SCSI bus 13 (step S1-2).

If it is determined in step S1-1 that the bus 13 is in a bus-free phase, the processor 43 outputs a SCSI-ID#5 for the controller 22 to the SCSI bus 13 and places the SCSI bus 13 in an arbitration phase, thus requesting a use of the SCSI bus 13 (step S1-3). Since it is stipulated in SCSI that a device requesting a largest number as a SCSI-ID acquires a use of the SCSI bus, out of a plurality of devices issuing requests at the same time, recognition of drive units can be conducted efficiently by setting the SCSI-ID for the controller 22 to be a relatively large number. Therefore, the SCSI-ID#5 is assigned to the controller 22.

When the controller 22 acquires a use of the SCSI bus 13 in step S1-3, the processor 43 controls the SCSI controller 40 and places the SCSI bus 13 in a selection phase wherein a target is selected (step S1-4).

After controlling the SCSI controller 40 and placing the SCSI bus 13 in a selection phase in step S1-4, the processor 43 selects the target SCSI-ID#N and outputs it to the SCSI bus 13 and waits for a response from a target device to which the SCSI-ID#N is assigned (step S1-5).

Referring to FIG. 8, when the controller 22 outputs the SCSI-ID to the SCSI bus 13 in step S1-5 (step S2-1), the target device receives the SCSI-ID from the controller 22. The target device then responds to the controller 22 and waits for an inquiry command from the controller 22 (step S2-2, S2-3). The controller 22 detects the response from the target device in the form of an inversion of a BSY (BUSY) signal on the SCSI bus 13.

If no response is returned from the target in step S1-5, the controller 22 is able to determine that the output SCSI-ID is not assigned to the device. The flow of operation then returns to step S1-1. The controller 22 acquires a use of the SCSI bus 13 again and waits for a response to another output SCSI-ID.

If the controller 22 receives a response from the device in step S1-5, the processor 43 of the controller 22 places the SCSI bus 13 in an information transfer phase and outputs an inquiry command (step S1-6).

The controller 22 waits for inquiry data from the target device that the inquiry command is directed to (step S1-6, S1-7).

Referring to FIG. 8, the target device sends inquiry data stored in a memory (the memories 12b, 15d and 36 are examples of such a memory) upon receiving the inquiry command (step S2-4).

Upon receiving the inquiry data from the target device, the processor 43 of the controller 22 carries out a command end process. The processor 43 then controls the SCSI controller 40 and places the SCSI bus 13 in a bus-free phase (step S1-8, S1-9).

Next, the processor 43 of the controller 22 compares the vendor identification information and the product identification information found in the received inquiry data with the vendor identification information and the product identification information stored in the memory 41, so as to determine whether the vendor identification information and the product identification information found in the inquiry data are stored in the memory 41 (step S1-10, S1-11).

If the vendor identification information and the product identification information received from the target device is found in the memory 41 in step S1-11, it can be determined that the vendor identification information and the product identification information received are for the drive unit installable in the library apparatus 14. For example, the vendor identification information and the product identification information of the device having the SCSI-ID#0 or SCSI-ID#1 is found in the memory 41 so that those devices are determined to be a drive unit installable in the library apparatus 14. The vendor identification information and the product identification information of the host computer 12 (SCSI-ID#2) and the external hard disk drive 15 (SCSI-ID#7) are not found in the memory 41.

As noted previously, in correspondence with the vendor identification information and the product identification information, the memory 41 also stores the information related to the insertion operation, i.e., the insertion force, the insertion speed and the holding time. The insertion-related information for the device whose vendor identification information and product identification information are found in the memory 41 is retrieved from the memory 41 and stored in the internal table 42 (step S1-12).

Next, the processor 43 increments N specifying a target SCSI-ID so as to carry out similar processes as above on a device having the next SCSI-ID (step S1-13). It is stipulated that the SCSI-ID#8 or greater is not allowed. Therefore, when N is incremented to 8, it is determined that all the devices connected to the SCSI bus 13 have been recognized (step S1-14). If N is smaller than 8, it is determined in step S1-14 that there are other devices that are not identified. Thereupon, the flow of operation returns to step S1-2.

In the case of the aforementioned exemplary system, once is determined in step S1-14 that all the devices connected to the SCSI bus 13 have been recognized, a recognition that the SCSI-ID#0 device and the SCSI-ID#1 device provide the vendor identification information and the product identification information found in the memory 41 results. In other words, the controller 2 is able to recognize that two drive units are installed in the library apparatus 14. The number of recognized drive units is stored in the internal table 42, whereupon the flow of operation ends (step S1-15).

Thus, the library apparatus 14 is configured such that information which is necessary to control the transport device 19, i.e., the number and types of the drive units, is stored in the internal table 42 of the controller 22.

A description will now be given of an operation of the library apparatus 14. It is assumed that the library apparatus 14 is controlled by a command from the host computer 12.

For example, when the host computer 12 issues a command to the controller 22 requesting the information recording medium 16 housed in the medium container 17 to be moved to the drive unit 18 having the SCSI-ID#0, the controller 22 controls the transport part 39 of the transport device 19 so that the manipulator part 38 holds the information recording medium 16 of the medium container 17 according to the request from the host computer 12 and moves the information recording medium 16 to the drive unit 18 having the SCSI-ID#0 specified by the host computer 12 so that the information recording medium 16 is inserted into the drive unit 18 having the SCSI-ID#0. The target position for operation of the manipulator part 38 is determined in accordance with the information specifying the number of drive units 18 and stored in the internal table 42. Insertion operation for inserting the information recording medium 16 into the drive unit 18 is controlled in accordance with the insertion force N, the insertion speed V and the holding time T.

When the host computer 12 issues a command to the controller 12 requesting the information recording medium 16 mounted in the drive unit 18 having the SCSI-ID#0 to be moved to a position P2 of the medium container 17, the controller 22 controls the transport part 39 of the transport device 19 so that the manipulator part 38 moves to face the drive unit having the SCSI-ID#0 specified by the host computer 12, holds the information recording medium 16 ejected via the opening 33 of the drive unit 18 and houses the information recording medium 16 in the target medium container 17 specified by the host computer 12. The target position for operation of the manipulator part 38 is determined in accordance with the information specifying the number of drive units 18 and stored in the internal table 42. Insertion operation for inserting the information recording medium 16 into the drive unit 18 is controlled in accordance with the insertion force N, the insertion speed V and the holding time T.

As has been described, according to the embodiment of the present invention, the vendor identification information and the product identification information for the drive units installed in the library apparatus are referred to so as to automatically set the number and types of the drive units installed upon power-on of the library apparatus. Accordingly, manual setting is unnecessary and mistakes in input occur less frequently and the time required for setting is reduced.

The present invention is not limited to the above described embodiments, and variations and modifications may be made without departing from the scope of the present invention.

What is claimed is:

1. A library apparatus comprising:
   a medium container for containing an information recording medium;
   a drive unit having said information recording medium mounted therein and capable of reading information from said information recording medium said drive unit having a memory unit for storing identification information which identifies the type of said drive unit;
   medium transport means for transporting said information recording medium between said medium container and said drive unit;
   an initiator for issuing an instruction to the drive unit installed in said library apparatus to cause the drive unit to send the identification information via a bus; and
   control means for controlling said medium transport means based upon the type of said drive unit said control means changing operation of said medium transport means in accordance with the identification information sent from the drive unit.

2. The library apparatus as claimed in claim 1, wherein said recognizing means recognizes the number of drive units installed in the library apparatus by knowing the number of matches of identification information.

3. The library apparatus as claimed in claim 1, wherein said recognizing means recognizes types of drive units installed in the library apparatus by knowing matches of identification information.

4. The library apparatus as claimed in claim 1, further comprising medium transport control means for controlling said medium transport means in accordance with the identification information recognized by said recognizing means.

5. The library apparatus as claimed in claim 1, wherein said memory stores predetermined operating parameters of each of the drive units in addition to the identification information, and said medium transport control means reads from said memory the predetermined operating parameters corresponding to the identification information recognized by the recognizing means, and controls said medium transport means to properly insert said information recording medium into the drive unit in accordance with the read predetermined operating parameters.

6. A library apparatus according to claim 1, wherein the identification information includes vendor identification information of said drive unit.

7. A library apparatus according to claim 1, wherein the identification information includes product identification information of said drive unit.

8. A library apparatus according to claim 1, wherein the identification information includes vendor information and product identification information of said drive unit.

9. A library apparatus according to claim 1, further comprising:

a memory for storing identification information for drive units installable in said library apparatus; and recognizing means for comparing, in accordance with an instruction issued by said initiator, the identification information sent by the drive unit connected to said bus with the identification information stored in said memory, and recognizing the type of the drive units installed in said library apparatus.

10. A library apparatus according to claim 1, wherein the changing of operation of said medium transport means by said control means is changing of insertion force of said information recording medium to said drive unit.

11. A library apparatus according to claim 1, wherein the changing of operation of said medium transport means by said control means is changing of insertion speed of said information recording medium to said drive unit.

12. A library apparatus according to claim 1, wherein the changing of operation of said medium transport means by said control means is changing of holding time of said information recording medium.

13. A library apparatus according to claim 6, wherein the changing of operation of said medium transport means by said control means is changing of insertion force of said information recording medium to said drive unit.

14. A library apparatus according to claim 6, wherein the changing of operation of said medium transport means by said control means is changing of insertion speed of said information recording medium to said drive unit.

15. A library apparatus according to claim 6, wherein the changing of operation of said medium transport means by said control means is changing of holding time of said information recording medium.

16. A library apparatus according to claim 7, wherein the changing of operation of said medium transport means by said control means is changing of insertion force of said information recording medium to said drive unit.

17. A library apparatus according to claim 7, wherein the changing of operation of said medium transport means by said control means is changing of insertion speed of said information recording medium to said drive unit.

18. A library apparatus according to claim 7, wherein the changing of operation of said medium transport means by said control means is changing of holding time of said information recording medium.

19. A library apparatus comprising:

a medium container for containing an information recording medium;

a drive unit having said information recording medium mounted therein and capable of reading information from said information recording medium, said drive unit having a memory unit for storing identification information which identifies the type of said drive unit;

medium transport means connected to said drive unit via a bus and transporting said information recording medium between said medium container and said drive unit; wherein said medium transport means issues to the drive unit via said bus an instruction for sending identification information for identifying the drive unit, and said medium transport means changes an operation of moving the information recording medium in accordance with the identification information sent from the drive unit.

* * * * *